United States Patent
Hashimoto

(10) Patent No.: US 9,028,366 B2
(45) Date of Patent: May 12, 2015

(54) VEHICLE AND METHOD FOR CONTROLLING VEHICLE

(75) Inventor: Keita Hashimoto, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/985,387

(22) PCT Filed: Feb. 16, 2011

(86) PCT No.: PCT/JP2011/053224
§ 371 (c)(1),
(2), (4) Date: Aug. 14, 2013

(87) PCT Pub. No.: WO2012/111103
PCT Pub. Date: Aug. 23, 2012

(65) Prior Publication Data
US 2013/0324363 A1  Dec. 5, 2013

(51) Int. Cl.
| | | |
|---|---|---|
| F16H 59/70 | (2006.01) | |
| B60W 10/08 | (2006.01) | |
| F01N 9/00 | (2006.01) | |
| B60K 6/445 | (2007.10) | |
| B60W 10/105 | (2012.01) | |
| B60W 30/18 | (2012.01) | |
| B60W 20/00 | (2006.01) | |

(52) U.S. Cl.
CPC . *F01N 9/00* (2013.01); *B60K 6/445* (2013.01); *Y02T 10/6239* (2013.01); *B60W 10/105* (2013.01); *B60W 30/18127* (2013.01); *B60Y 2300/474* (2013.01); *B60W 20/1082* (2013.01)

(58) Field of Classification Search
None
See application file for complete search history.

(56) References Cited

U.S. PATENT DOCUMENTS

| 5,537,321 A | 7/1996 | Yoshizaki et al. |
|---|---|---|
| 6,931,839 B2 * | 8/2005 | Foster ............ 60/284 |
| 2009/0043437 A1 | 2/2009 | Shiino |

FOREIGN PATENT DOCUMENTS

| JP | H06129245 A | 5/1994 |
|---|---|---|
| JP | 2004316497 A | 11/2004 |
| JP | 2007-283878 A | 11/2007 |
| JP | 2009-041403 A | 2/2009 |
| JP | 2009-191681 A | 8/2009 |
| JP | 2009-214703 A | 9/2009 |
| JP | 2010-018181 A | 1/2010 |

* cited by examiner

*Primary Examiner* — Ramya Burgess
*Assistant Examiner* — Mark Manley
(74) *Attorney, Agent, or Firm* — Kenyon & Kenyon LLP

(57) ABSTRACT

A hybrid vehicle in which at least two shift ranges can be selected for a single running direction includes an engine, a motor generator, an EHC raising the temperature of a catalyst for cleaning up an exhaust gas from the engine, and an ECU. While the vehicle is running, if the engine is stopped and, of the two shift ranges, a shift range where larger decelerating force is produced by regenerative braking of the motor generator has been selected, the ECU causes the EHC to raise the temperature of the catalyst using electric power generated by the motor generator.

5 Claims, 4 Drawing Sheets

VEHICLE AND METHOD FOR CONTROLLING VEHICLE

CROSS REFERENCE TO RELATED APPLICATION

This is a national phase application based on the PCT International Patent Application No. PCT/JP2011/053224 filed on Feb. 16, 2011, the entire contents of which are incorporated herein by reference.

TECHNICAL FIELD

The present invention relates to a vehicle and a method for controlling a vehicle, and more particularly to controlling a warming-up device for a catalyst for cleaning up an exhaust gas from an internal combustion engine in a hybrid vehicle equipped with the internal combustion engine and a rotating electric machine.

BACKGROUND ART

In recent years, as an environmentally-friendly vehicle, attention is being given to a vehicle having mounted thereon a power storage device (e.g., a secondary battery, a capacitor or the like) and running using driving force produced from electric power stored in the power storage device. Examples of such a vehicle include an electric vehicle, a hybrid vehicle, a fuel-cell vehicle, and the like. A technique for charging the power storage device mounted on such a vehicle by a commercial power supply of high power generation efficiency has been proposed.

Among hybrid vehicles, a vehicle in which a vehicle-mounted power storage device can be charged by a power supply outside the vehicle (hereinafter also briefly referred to as an "external power supply") similarly to an electric vehicle is known (hereinafter also briefly referred to as "external charging"). For example, a so-called "plug-in hybrid vehicle" is known, whose power storage device can be charged by a power supply at an ordinary house by connecting a plug receptacle provided at the house and a charging inlet provided for the vehicle with a charging cable. Accordingly, it can be expected that fuel consumption efficiency of the hybrid vehicle is increased.

Depending on the running state, such a hybrid vehicle may run only with driving force using electric power from the power storage device with the engine combustion operation intermittently stopped during running. In such a case, the temperature of a catalyst for cleaning up an exhaust gas from the engine drops with time. Then, if the temperature of the catalyst has fallen below a catalytic activation temperature at the next engine startup, the exhaust gas cannot be cleaned up appropriately, but discharge of a substance leading to air pollution may be increased.

Japanese Patent Laying-Open No. 2010-018181 (PTD 1) discloses a technique in which, when there is a request to warm up a catalyst due to a drop in temperature of the catalyst in a hybrid vehicle having a catalyst warming-up device (hereinafter also referred to as EHC (Electrical Heated Catalyst)), the EHC is driven using electric power from a power storage device to warm up the catalyst.

CITATION LIST

Patent Document

PTD 1: Japanese Patent Laying-Open No. 2010-018181
PTD 2: Japanese Patent Laying-Open No. 2009-191681
PTD 3: Japanese Patent Laying-Open No. 2009-041403

SUMMARY OF INVENTION

Technical Problem

When running on a gentle downhill, for example, a hybrid vehicle in some cases runs while preventing the speed from increasing by means of so-called engine braking without using a foot brake but using frictional force produced by engine rotation and regenerative braking power produced by a motor generator. In such a running state, there is less driving torque for running. Therefore, the engine combustion operation is stopped in many cases. In this case, the temperature of the catalyst gradually decreases along with the stop of the engine combustion operation.

In such a case, the hybrid vehicle including an EHC as disclosed in Japanese Patent Laying-Open No. 2010-018181 (PTD 1) can maintain the temperature of the catalyst at a predetermined temperature by operating the EHC. However, if the EHC is driven using electric power from the power storage device as described in Japanese Patent Laying-Open No. 2010-018181 (PTD 1), overall vehicle efficiency may be reduced due to power conversion loss.

The present invention was made to solve such a problem, and has an object to, in a hybrid vehicle, raise the temperature of a catalyst using regenerative power to thereby ensure a catalytic activation temperature while preventing reduction in vehicle efficiency.

Solution to Problem

A vehicle according to the present invention in which at least two shift ranges can be selected for a single running direction includes an internal combustion engine, a rotating electric machine, a warming-up device, and a control device for controlling the warming-up device. The rotating electric machine is coupled to a driving wheel of the vehicle to produce driving force for causing the vehicle to run and capable of generating electric power by rotary force of the driving wheel. The warming-up device raises the temperature of a catalyst for cleaning up an exhaust gas from the internal combustion engine. While the vehicle is running, if a predetermined condition that the internal combustion engine is stopped and, of the two shift ranges, a shift range where larger decelerating force is produced by regenerative braking of the rotating electric machine has been selected is met, the control device causes the warming-up device to raise the temperature of the catalyst using generated electric power by the rotating electric machine.

Preferably, if the predetermined condition is met and a condition that the temperature of the catalyst falls below a predetermined threshold value is met, the control device causes the warming-up device to raise the temperature of the catalyst using the generated electric power.

Preferably, the threshold value is set at a second temperature which is higher than a first temperature set to be higher than an activation temperature of the catalyst when raising the temperature if the predetermined condition is not met.

Preferably, if the predetermined condition is met and a condition that a signal indicating an accelerator pedal position falls below a reference value is met, the control device causes the warming-up device to raise the temperature of the catalyst using the generated electric power.

Preferably, if the predetermined condition is met and a foot brake is not operated by a user, the control device causes the warming-up device to raise the temperature of the catalyst using the generated electric power.

Preferably, if the predetermined condition is met, the control device causes the warming-up device to raise the temperature of the catalyst using only the generated electric power.

A method for controlling according to the present invention is a method for controlling a vehicle in which at least two shift ranges can be selected for a single running direction. The vehicle includes an internal combustion engine, a rotating electric machine coupled to a driving wheel of the vehicle to produce driving force for causing the vehicle to run and capable of generating electric power by rotary force of the driving wheel, and a warming-up device configured to raise the temperature of a catalyst for cleaning up an exhaust gas from the internal combustion engine. The method for controlling includes the steps of determining that, while the vehicle is running, a condition that the internal combustion engine is stopped and, of the two shift ranges, a shift range where larger decelerating force is produced by regenerative braking of the rotating electric machine has been selected is met; and if the condition is met, causing the warming-up device to raise the temperature of the catalyst using generated electric power by the rotating electric machine.

Preferably, the method for controlling further includes the step of detecting the temperature of the catalyst. In the step of driving the warming-up device, the temperature of the catalyst is raised by the warming-up device if the predetermined condition is met and the temperature of the catalyst having been detected falls below a predetermined threshold value.

Advantageous Effects of Invention

According to the present invention, by raising the temperature of a catalyst using regenerative power in a hybrid vehicle, a catalytic activation temperature can be ensured while preventing reduction in vehicle efficiency.

DESCRIPTION OF EMBODIMENTS

Figure 1:
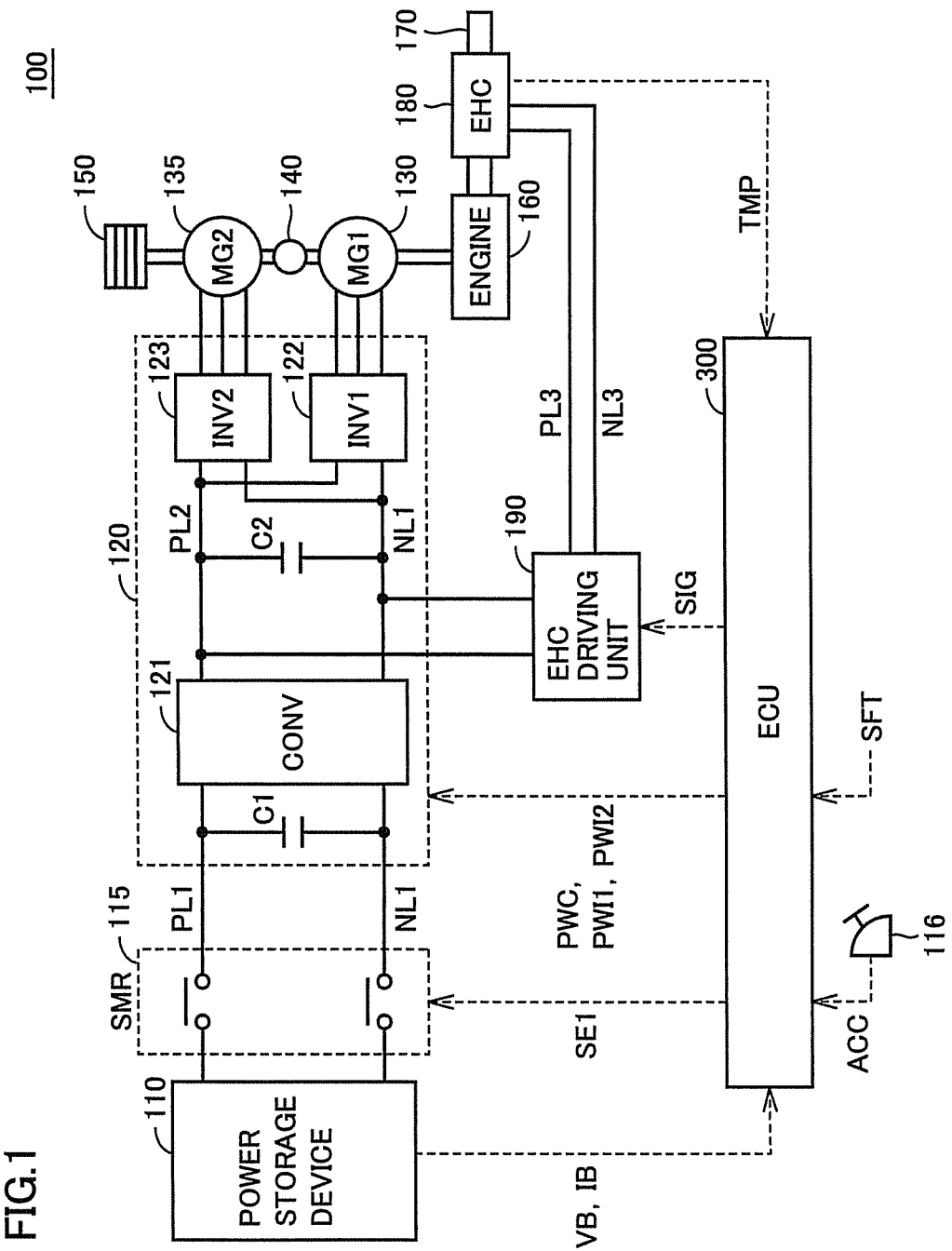
FIG. 1 is an overall block diagram of a vehicle according to a first embodiment.

Embodiments of the present invention will be described below in detail with reference to the drawings. It is noted that, in the drawings, the same or corresponding portions have the same reference characters allotted, and detailed description thereof will not be repeated.

First Embodiment

Referring to FIG. 1, a vehicle 100 includes a power storage device 110, a system main relay (SMR) 115, a PCU (Power Control Unit) 120 as a driving device, motor generators 130, 135, a motive power transmission gear 140, a driving wheel 150, an engine 160 as an internal combustion engine, an exhaust pipe 170 which emits an exhaust gas from engine 160, an EHC (Electrical Heated Catalyst) 180 placed in exhaust pipe 170, an EHC driving unit 190, and an ECU (Electronic Control Unit) 300 as a control device. PCU 120 includes a converter 121, inverters 122, 123, and capacitors C1, C2.

Power storage device 110 is a power storage component configured to be capable of being charged and discharged. Power storage device 110 includes, for example, a secondary battery, such as a lithium ion battery, a nickel-metal hydride battery or a lead battery, or a power storage element, such as an electric double layer capacitor.

Power storage device 110 is connected to PCU 120 with a power line PL1 and a ground line NL1. Power storage device 110 supplies electric power for producing driving force for vehicle 100 to PCU 120. Power storage device 110 also stores electric power generated by motor generators 130, 135. The output of power storage device 110 is about 200V, for example.

Relays included in SMR 115 are respectively inserted in power line PL1 and ground line NL1 that connect power storage device 110 and PCU 120. SMR 115 switches between supply and interruption of electric power between power storage device 110 and PCU 120 based on a control signal SE1 from ECU 300.

Converter 121 performs voltage conversion between power line PL1 and ground line NL1, and a power line PL2 and ground line NL1 based on a control signal PWC from ECU 300.

Inverters 122, 123 are connected in parallel to power line PL2 and ground line NL1. Inverters 122, 123 convert DC power supplied from converter 121 into AC power to drive motor generators 130, 135, respectively, based on control signals PWI1 and PWI2 from ECU 300, respectively.

A capacitor C1 is provided across power line PL1 and ground line NL1, and decreases voltage fluctuation across power line PL1 and ground line NL1. A capacitor C2 is provided across power line PL2 and ground line NL1, and decreases voltage fluctuation across power line PL2 and ground line NL1.

Motor generators 130, 135 are AC rotating machines, and are each implemented by, for example, a permanent magnet-type synchronous motor having a rotor with permanent magnets embedded therein.

Output torque of motor generators 130, 135 is transmitted to driving wheel 150 via motive power transmission gear 140 configured to include a reduction gear and a power split device, thereby causing vehicle 100 to run. Motor generators 130, 135 are capable of generating electric power by means of rotary force of driving wheel 150 during a regenerative braking operation of vehicle 100. The generated electric power is converted by PCU 120 into charging power for power storage device 110.

Motor generators 130, 135 are also coupled to engine 160 with motive power transmission gear 140 interposed therebetween. Motor generators 130, 135 and engine 160 are operated cooperatively by ECU 300 to produce required vehicle driving force. Furthermore, motor generators 130, 135 are capable of generating electric power by means of rotation of engine 160, and power storage device 110 can be charged using this generated electric power. In the first embodiment, motor generator 135 shall be exclusively used as a motor for driving wheel 150, and motor generator 130 shall be exclusively used as an electric power generator driven by engine 160.

It is noted that, although FIG. 1 shows the configuration provided with two motor generators by way of example, the number of motor generators is not limited to this as long as the configuration is provided with a motor generator capable of generating electric power by means of engine 160. A single motor generator may be provided, or a configuration provided with more than two motor generators may be adopted.

Engine 160 is controlled by ECU 300 in rotation speed, valve open/close timing, fuel flow rate, and the like, and produces driving force for causing vehicle 100 to run.

Exhaust pipe 170 is coupled to an exhaust port of engine 160 to emit the exhaust gas produced in engine 160 to the outside of the vehicle.

EHC 180 is placed at the middle of exhaust pipe 170. EHC 180 includes a so-called three-way catalyst unit, and removes a harmful substance in the exhaust gas, such as nitrogen oxide. EHC 180 also raises the temperature of a three-way catalyst included therein using electric power supplied from EHC driving unit 190 controlled by a control signal SIG from ECU 300. Generally, the three-way catalyst cannot fully exhibit its function as a catalyst unless it reaches an activation temperature or above. EHC 180 raises the temperature of the three-way catalyst using electric power supplied from EHC driving unit 190, thereby allowing the three-way catalyst to exhibit its function as a catalyst promptly.

EHC 180 further includes a temperature sensor (not shown), and detects a catalytic temperature TMP to output the detection result to ECU 300. ECU 300 controls supply of electric power to EHC 180 by EHC driving unit 190 based on this catalytic temperature TMP.

EHC driving unit 190 is connected to power line PL2 and ground line NL1, and is connected to EHC 180 with a power line PL3 and a ground line NL3. EHC driving unit 190 generates electric power for driving EHC 180 using electric power from power storage device 110 or electric power generated by motor generators 130, 135, and switches between supply and interruption of electric power to EHC 180. As EHC driving unit 190, a DC/DC converter, an inverter, a relay, or the like is included, for example.

ECU 300 includes a CPU (Central Processing Unit), a memory device, and an input/output buffer neither shown in FIG. 1, to receive signals from respective sensors and the like and output control signals to respective devices, and controls vehicle 100 and the respective devices. It is noted that this control is not limited to processing by software, but may be processed by dedicated hardware (electronic circuit).

ECU 300 calculates SOC (State of Charge) of power storage device 110 based on detection values of a voltage VB and a current IB of a voltage sensor and a current sensor (neither shown) provided for power storage device 110.

ECU 300 receives an accelerator pedal position ACC based on the operation state of an accelerator pedal 116, a shift range SFT determined based on the shift position of a shift lever (not shown) selected by a user or the like, and catalytic temperature TMP from EHC 180. ECU 300 executes EHC drive control which will be described later based on these pieces of information. It is noted that although FIG. 1 shows the configuration provided with one control device as ECU 300, a configuration in which, for example, individual control devices are provided for every function or every device to be controlled, such as a control device for PCU 120, a control device for power storage device 110, and the like may be adopted.

When running on a gentle downhill as described above, such hybrid vehicle 100 in many cases runs while preventing the speed from increasing by means of so-called engine braking without using the foot brake but using frictional force produced by rotation of engine 160 and regenerative braking power produced by motor generators 130, 135. At this time, electric power generated by regenerative braking of motor generators 130, 135 fluctuates depending on the state of charge of power storage device 110.

For example, when power storage device 110 is already in a fully charged state, charging by power storage device 110 cannot be performed using generated electric power. In such a case, power generation by motor generators 130, 135 is interrupted, and the rotation speed of engine 160 is increased to further increase frictional force, thereby ensuring deceleration. When deceleration is increased by the frictional force of engine 160, energy used for deceleration will become heat and will be released. Thus, useless heat loss will occur.

Moreover, in such a state, the combustion operation of engine 160 is generally at a stop. Therefore, the temperature of the catalyst drops with time. When the temperature of the catalyst falls below the activation temperature, it will be necessary to raise the temperature of the catalyst by EHC 180.

Therefore, in this first embodiment, when such a state is brought about, EHC drive control is executed in which deceleration by engine 160 is decreased, while deceleration by regenerative braking of motor generators 130, 135 is increased, and the generated electric power is directly applied to EHC 180. Accordingly, heat loss by engine 160 can be reduced, and conversion efficiency can be prevented from being reduced by supply of electric power to EHC 180 without passing through converter 121. Furthermore, even if power storage device 110 is in a fully charged state, generated electric power can be collected by EHC 180. Therefore, energy balance can be improved.

Figure 2:
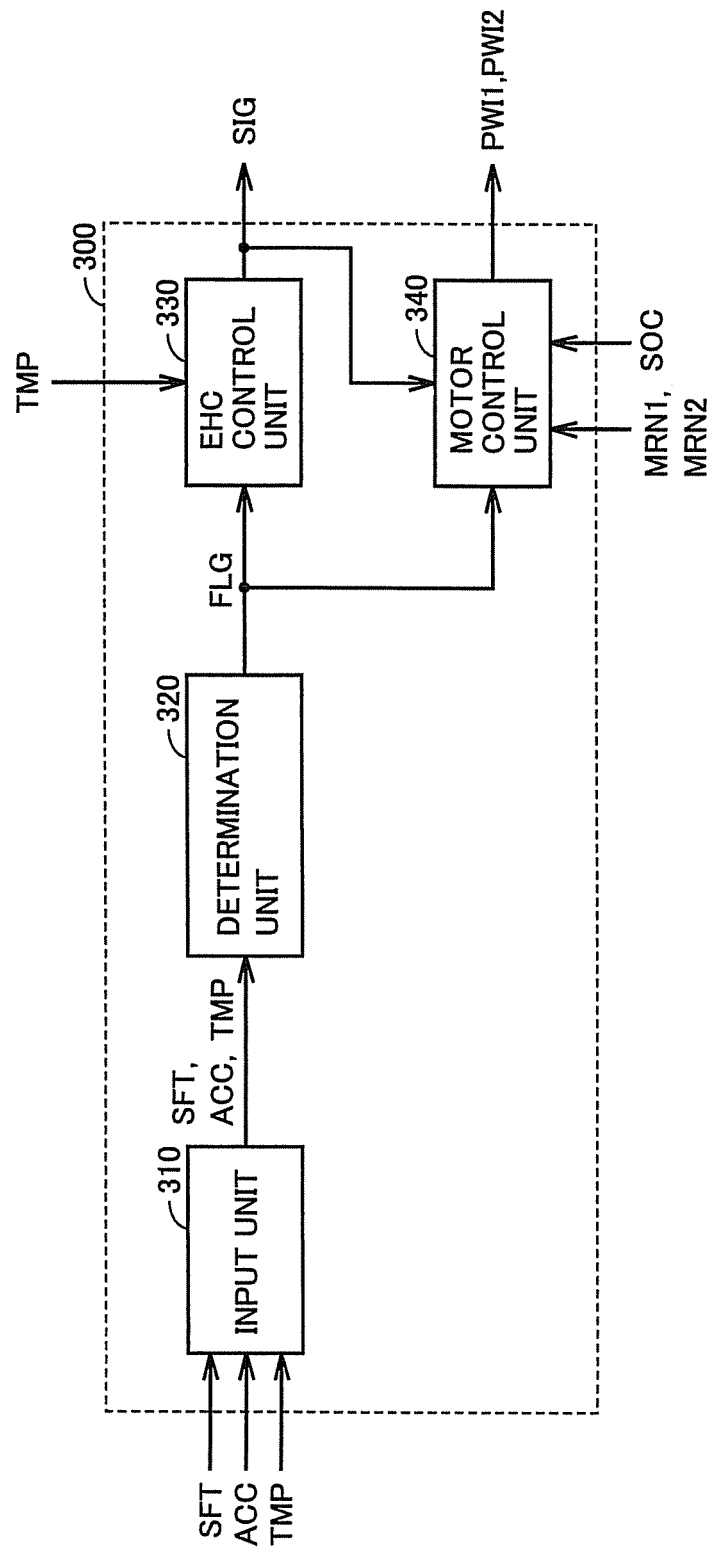
FIG. 2 is a functional block diagram for illustrating EHC drive control executed by ECU in the first embodiment.

FIG. 2 is a functional block diagram for illustrating EHC drive control executed by ECU 300 in the first embodiment. Each functional block depicted in the functional block diagram of FIG. 2 is achieved by hardware- or software-like processing by ECU 300.

Referring to FIGS. 1 and 2, ECU 300 includes an input unit 310, a determination unit 320, an EHC control unit 330, and a motor control unit 340.

Input unit 310 receives shift range SFT, accelerator pedal position ACC from accelerator pedal 116, and catalytic temperature TMP from EHC 180. Input unit 310 outputs these pieces of information to determination unit 320.

Determination unit 320 determines whether or not it is necessary to cause EHC 180 to raise the temperature of the catalyst based on catalytic temperature TMP from input unit 310. Based on the information on shift range SFT and accelerator pedal position ACC, determination unit 320 determines whether or not the vehicle is running with so-called engine braking, by which decelerating force is produced using rotation of engine 160 and regenerative braking, being more effective than while running on a flat road. Based on the result of these determinations, determination unit 320 generates an execution flag FLG for EHC drive control, and outputs the flag to EHC control unit 330 and motor control unit 340.

EHC control unit 330 receives execution flag FLG from determination unit 320 and catalytic temperature TMP. When it has been determined that it is necessary to raise the temperature of the catalyst, EHC control unit 330 generates control signal SIG to control EHC driving unit 190 such that catalytic temperature TMP becomes more than or equal to the activation temperature.

Motor control unit 340 receives execution flag FLG from determination unit 320, rotation speeds MRN1, MRN2 calculated based on the rotation angles from rotational angle sensors (not shown) provided in motor generators 130, 135, SOC of power storage device 110, and control signal SIG from EHC control unit 330. Based on these pieces of information, motor control unit 340 determines electric power to be generated by motor generators 130, 135, and generates and outputs control signals PWI1, PWI2 for inverters 122, 123 to which the generated electric power is to be output.

Figure 3:
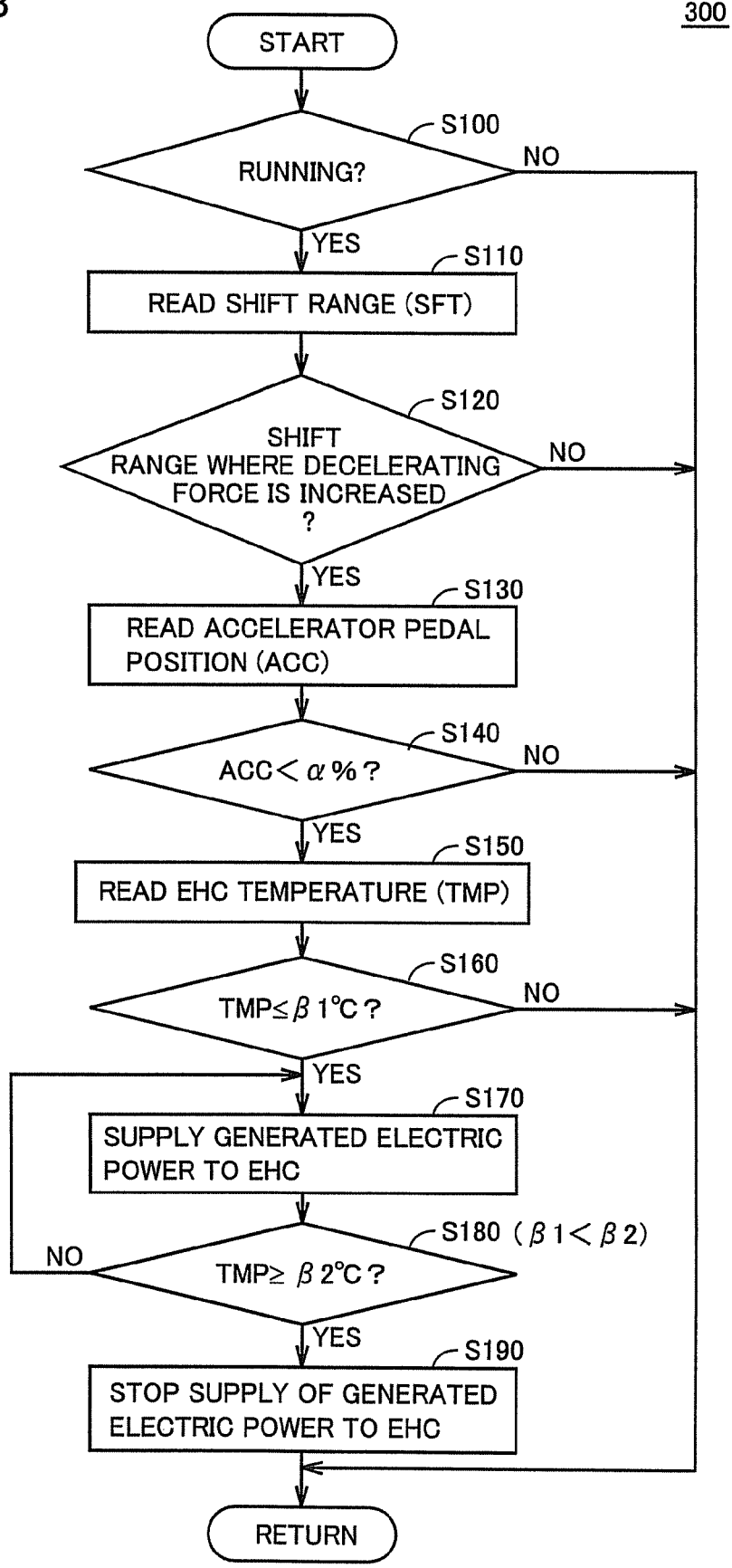
FIG. 3 is a flowchart for illustrating the details of EHC drive control processing executed by ECU in the first embodiment.

FIG. 3 is a flowchart for illustrating the details of EHC drive control processing executed by ECU 300 in the first embodiment. Processing in the flowchart shown in FIG. 3 is achieved by invoking a program previously stored in ECU 300 from a main routine and executing the program with a predetermined period. Alternatively, part or all of the steps can also be processed by dedicated hardware (electronic circuit).

Referring to FIGS. 1 and 3, ECU 300 determines in step (hereinafter abbreviated to S) 100 whether or not vehicle 100 is running.

If vehicle 100 is not running (NO in S100), the process is returned to the main routine without executing the control.

If vehicle 100 is running (YES in S100), ECU 300 reads current shift range SFT in S110.

ECU 300 then determines in S120 whether or not shift range SFT having been read indicates a shift range where decelerating force is increased. The shift range where decelerating force is increased means a shift range where a shift gear at a lower speed relative to an optimum shift gear for the current speed of vehicle 100 is selected. For example, this corresponds to the case where the shift lever is moved by user's operation to a shift position where a lower shift gear is selected, the case where, even at the same shift position, a selectable shift range is changed by another switch operation to a lower speed, the case where a change is made to a lower shift gear by abrupt depression of the accelerator pedal, that is, so-called kickdown occurs, and the like.

When the shift range where decelerating force is increased is not indicated (NO in S120), ECU 300 returns the process to the main routine.

When the shift range where decelerating force is increased is indicated (YES in S120), ECU 300 reads accelerator pedal position ACC in S130.

ECU 300 determines in S140 whether or not accelerator pedal position ACC having been read is smaller than a threshold value α (%) close to zero. That is, ECU 300 determines in S140 whether or not it is not in a power running state in which driving force for vehicle 100 is produced using electric power from power storage device 110 but in a regenerative state in which regeneration torque produces decelerating force for vehicle 100.

If accelerator pedal position ACC is more than or equal to threshold value α (NO in S140), ECU 300 returns the process to the main routine.

If accelerator pedal position ACC is smaller than threshold value α (YES in S140), the process is advanced to S150 where ECU 300 reads catalytic temperature TMP from EHC 180.

ECU 300 determines in S160 whether or not catalytic temperature TMP having been read is less than or equal to a threshold value β1 (e.g., 500° C.) determined based on the catalytic activation temperature. That is, ECU 300 determines whether or not it is necessary to raise the temperature of the catalyst.

If catalytic temperature TMP is more than threshold value β1 (NO in S160), it is unnecessary to raise the temperature of the catalyst. Therefore, ECU 300 returns the process to the main routine.

If catalytic temperature TMP is less than or equal to threshold value β1 (YES in S160), ECU 300 advances the process to S170 to control EHC driving unit 190 and raise the temperature of EHC 180 using electric power generated by motor generators 130, 135. It is noted that, at this time, inverters 122, 123 may be controlled according to necessity to adjust the degree of generated electric power.

The process is then advanced to S180 where ECU 300 determines whether or not catalytic temperature TMP has reached or exceeded a threshold value β2 which is larger than above-mentioned threshold value β1. It is noted that, since the temperature rise of EHC 180 in the first embodiment is intended to effectively utilize energy that would originally be released (discarded) as thermal energy, threshold value β2 is preferably set at a value (e.g., about 550° C.) which is sufficiently higher than the catalytic activation temperature (e.g., 450° C.) so as to collect a larger amount of energy from a viewpoint of improving energy efficiency.

If catalytic temperature TMP is smaller than threshold value β2 (NO in S180), the process is returned to S170 where temperature rise of EHC 180 is continued.

If catalytic temperature TMP is more than or equal to threshold value β2 (YES in S180), the process is advanced to S190 where ECU 300 stops supplying electric power to EHC 180 to stop raising the temperature of the catalyst.

By executing the process in accordance with the control as described above, in the case where a hybrid vehicle is running on a gentle downhill by means of so-called engine braking, the temperature of the catalyst can be directly raised using regenerative power, and the catalytic activation temperature can be ensured while preventing reduction in vehicle efficiency.

Second Embodiment

In the second embodiment, a variation of the first embodiment described above will be described.

Figure 4:
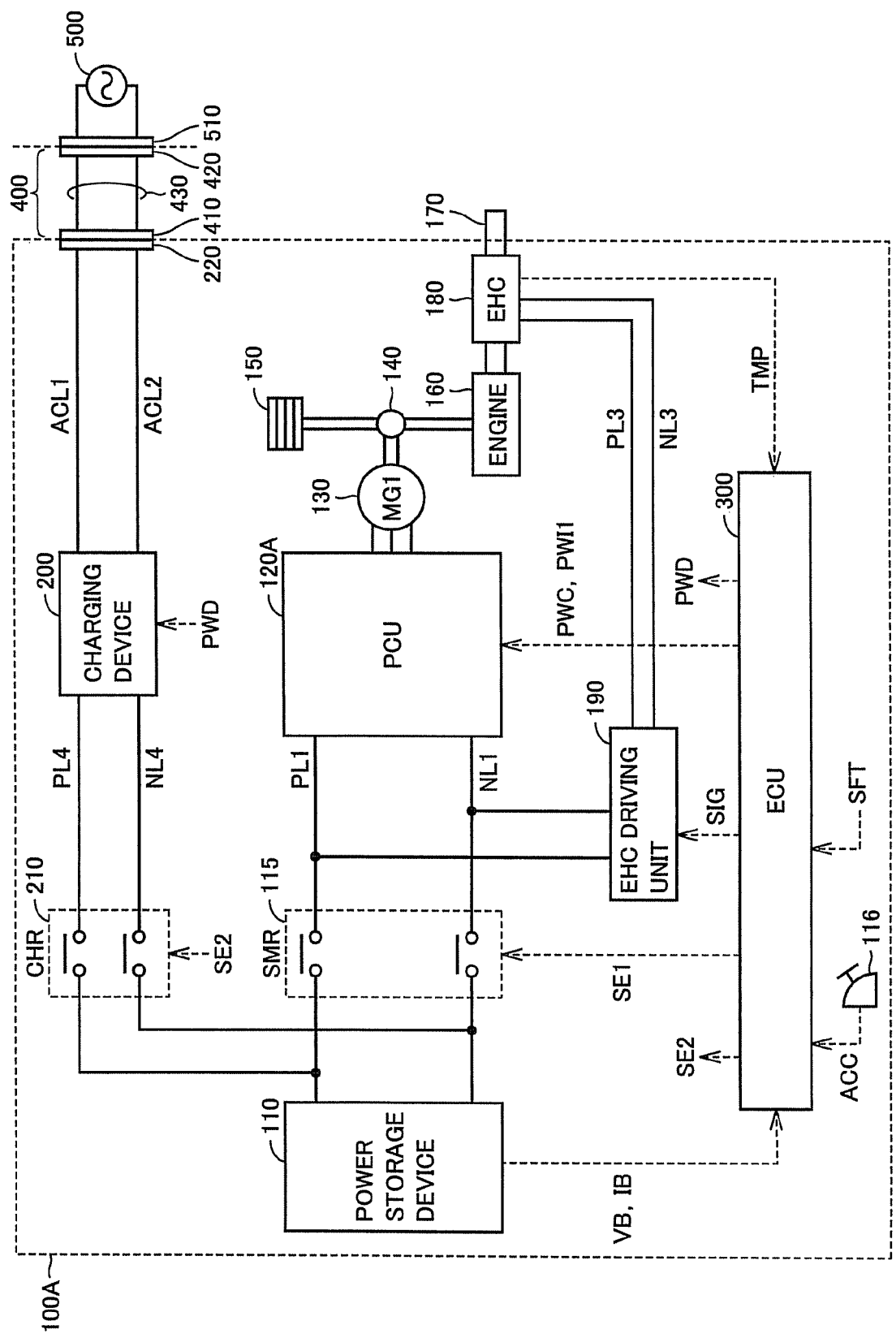
FIG. 4 is an overall block diagram of a vehicle according to a second embodiment.

FIG. 4 is an overall block diagram of a vehicle 100A according to the second embodiment. In FIG. 4, a configuration in which power storage device 110 can be charged with electric power from an external power supply 500 has been added to the configuration of vehicle 100 shown in FIG. 1, and the electric power supply unit to EHC driving unit 190 and the mechanism for producing driving force have been changed. In FIG. 4, description of the same elements as those of FIG. 1 will not be repeated.

Referring to FIG. 4, vehicle 100A is provided with only one motor generator, rather than two motor generators as vehicle 100 of FIG. 1. In correspondence with this, vehicle 100 is provided with a PCU 120A instead of PCU 120 of FIG. 1. Although the internal configuration of PCU 120A is not shown in detail, PCU 120A includes one inverter corresponding to motor generator 130. In this way, EHC drive control described in the first embodiment can also be applied to a hybrid vehicle provided with only one motor generator.

In vehicle 100A, EHC driving unit 190 is connected to power line PL1 and ground line NL1 on the lower voltage side, unlike the connection in FIG. 1. For example, if the supply voltage for driving EHC 180 is a relatively low voltage, lowering or direct use of the voltage at the lower voltage side (e.g., 200V) can advantageously simplify the insulating structure, rather than lowering the voltage at the higher voltage side (e.g., 600V) as shown in FIG. 1.

Furthermore, as the configuration in which power storage device 110 can be charged with electric power from external power supply 500, vehicle 100A is provided with a charging device 200, a charging relay CHR 210, and a connection unit 220.

Connection unit 220 is provided at the body of vehicle 100 in order to receive electric power from external power supply 500. A charging connector 410 of a charging cable 400 is connected to connection unit 220. By connecting a plug 420 of charging cable 400 to a plug receptacle 510 of external power supply 500, electric power from external power supply 500 is transferred to vehicle 100 via an electric wire unit 430 of charging cable 400. A charging circuit interrupt device (also called "CCID") for switching between supply and interruption of electric power from external power supply 500 to vehicle 100 may be inserted in electric wire unit 430 of charging cable 400.

Charging device 200 is connected to connection unit 220 with power lines ACL1, ACL2. Charging device 200 is also connected to power storage device 110 with CHR 210 interposed therebetween. Charging device 200 converts AC power supplied from external power supply 500 into DC power that can be charged into power storage device 110 based on a control signal PWD from ECU 300.

Relays included in CHR 210 have their one ends connected to the positive electrode terminal and the negative electrode terminal of power storage device 110, respectively. The relays included in CHR 210 have their other ends connected to a power line PL4 and a ground line NL4 connected to charging device 200, respectively. CHR 210 switches between supply and interruption of electric power from charging device 200 to power storage device 110 based on a control signal SE2 from ECU 300.

In this way, the above-described EHC drive control is also applicable to a vehicle in which so-called external charging can be performed.

It is noted that it is not indispensable to simultaneously provide all of the configuration with external charging, the connection configuration of the EHC driving unit, and the configuration of the motor generator described in the second embodiment. That is, any one of the above-described modified configurations or a combination thereof can be applied to the configuration of the first embodiment shown in FIG. 1.

The shift range in the above description is not limited to the shift range in the forward running direction of the vehicle. That is, in the case of a vehicle having two or more shift ranges for the shift range to the reverse side, the present control is also applicable to the reverse side.

It should be construed that embodiments disclosed herein are by way of illustration in all respects, not by way of limitation. It is intended that the scope of the present invention is defined by claims, not by the description above, and includes all modifications and variations equivalent in meaning and scope to the claims.

REFERENCE SIGNS LIST 100, 100A vehicle; 110 power storage device; 115 SMR; 116 accelerator pedal; 120 PCU; 121 converter; 122, 123 inverter; 130, 135 motor generator; 140 motive power transmission gear; 150 driving wheel; 160 engine; 170 exhaust pipe; 180 EHC; 190 EHC driving unit; 200 charging device; 210 CHR; 220 connection unit; 300 ECU; 310 input unit; 320 determination unit; 330 EHC control unit; 340 motor control unit; 400 charging cable; 410 charging connector; 420 plug; 430 electric wire unit; 500 external power supply; 510 plug receptacle; ACL1, ACL2, PL1 to PL4 power line; C1, C2 capacitor; NL1 to NL4 ground line.

The invention claimed is:

1. A vehicle in which at least two shift ranges can be selected for a single running direction, comprising:
an internal combustion engine;
a rotating electric machine coupled to a driving wheel of said vehicle, the rotating electric machine producing driving force for causing said vehicle to run, and being capable of generating electric power by rotary force of said driving wheel;
a warming-up device configured to raise a temperature of a catalyst for cleaning up an exhaust gas from said internal combustion engine; and
a control device for controlling said warming-up device,
while said vehicle is running, if a predetermined condition that said internal combustion engine is stopped and, of said two shift ranges, a shift range where larger decelerating force is produced by regenerative braking of said rotating electric machine has been selected is met, said control device causing said warming-up device to start raising the temperature of said catalyst using generated electric power by said rotating electric machine when the temperature of said catalyst falls below a predetermined first threshold value, and to stop raising the temperature of said catalyst in response to arrival of the temperature of said catalyst at a second threshold value which is higher than said first threshold value,
if the predetermined condition is not met, said control device causing said warming-up device to stop raising the temperature of said catalyst in response to arrival of the temperature of said catalyst at said first threshold value.

2. The vehicle according to claim 1, wherein said first threshold value is a value indicating a temperature at which an activation temperature of said catalyst can be ensured.

3. The vehicle according to claim 1, wherein, if said predetermined condition is met and a condition that a signal indicating an accelerator pedal position falls below a reference value is met, said control device causes said warming-up device to raise the temperature of said catalyst using said generated electric power.

4. The vehicle according to claim 1, wherein, if said predetermined condition is met, said control device causes said warming-up device to raise the temperature of said catalyst using only said generated electric power.

5. A method for controlling a vehicle in which at least two shift ranges can be selected for a single running direction, said vehicle including
an internal combustion engine,
a rotating electric machine coupled to a driving wheel of said vehicle, the rotating electric machine producing driving force for causing said vehicle to run, and being capable of generating electric power by rotary force of said driving wheel, and
a warming-up device configured to raise a temperature of a catalyst for cleaning up an exhaust gas from said internal combustion engine,
said method for controlling comprising the steps of:
determining that, while said vehicle is running, a predetermined condition that said internal combustion engine is stopped and, of said two shift ranges, a shift range where larger decelerating force is produced by regenerative braking of said rotating electric machine has been selected is met;
detecting the temperature of said catalyst; and
if said predetermined condition is met, causing said warming-up device to start raising the temperature of said catalyst using generated electric power by said rotating electric machine when the detected temperature of said catalyst falls below a predetermined first threshold value, and to stop raising the temperature of said catalyst in response to arrival of the temperature of said catalyst at a second threshold value which is higher than said first threshold value,
if the predetermined condition is not met, causing said warming-up device to stop raising the temperature of said catalyst in response to arrival of the temperature of said catalyst at said first threshold value.

* * * * *